US008801938B2

(12) United States Patent
Allen (10) Patent No.: US 8,801,938 B2
(45) Date of Patent: Aug. 12, 2014

(54) METHOD AND DEVICE FOR UNDERWATER RECOVERY OF PRODUCTS OR POLLUTANTS (76) Inventor: Dana R. Allen, Reno, NV (US)

(*) Notice: Subject to any disclaimer, the term of this patent is extended or adjusted under 35 U.S.C. 154(b) by 0 days.

(21) Appl. No.: 13/175,878

(22) Filed: Jul. 3, 2011

(65) Prior Publication Data
US 2013/0270194 A1    Oct. 17, 2013

Related U.S. Application Data (60) Provisional application No. 61/361,380, filed on Jul. 3, 2010.

(51) Int. Cl.
E02F 3/88    (2006.01)
E21B 43/01   (2006.01)
E02B 15/04   (2006.01)
E02F 3/90    (2006.01)
E02F 5/00    (2006.01)
E02F 7/00    (2006.01)
C02F 1/40    (2006.01)

(52) U.S. Cl.
CPC ............... E02F 3/8858 (2013.01); E02F 3/905 (2013.01); E02F 5/006 (2013.01); E02F 7/005 (2013.01); E02B 15/04 (2013.01); C02F 1/40 (2013.01); E21B 43/0122 (2013.01); Y10S 210/923 (2013.01)
USPC ................. 210/747.4; 210/747.5; 210/170.04; 210/170.11; 210/539; 210/923; 37/317; 37/322; 166/357; 166/364; 405/60

(58) Field of Classification Search
USPC ........... 210/747.4, 747.5, 747.6, 800, 170.04, 210/170.05, 17.09, 170.11, 242.3, 539, 540, 210/923; 37/317, 321, 322; 166/357, 364; 405/60
See application file for complete search history.

(56) References Cited

U.S. PATENT DOCUMENTS

| 3,500,841 | A | * | 3/1970 | Logan | 210/923 |
| 3,666,100 | A | * | 5/1972 | Madej | 210/800 |
| 3,667,605 | A | * | 6/1972 | Zielinski | 210/170.11 |
| 4,060,487 | A | * | 11/1977 | Samsel | 210/242.3 |
| 4,395,157 | A | * | 7/1983 | Cunningham | 405/60 |
| 4,440,523 | A | * | 4/1984 | Milgram et al. | 210/170.11 |
| 4,449,850 | A | * | 5/1984 | Cessou et al. | 405/60 |
| 4,531,860 | A | * | 7/1985 | Barnett | 405/60 |
| 7,182,860 | B2 | * | 2/2007 | Lundin | 210/242.3 |
| 8,173,012 | B1 | * | 5/2012 | Che | 210/242.3 |
| 2008/0135494 | A1 | * | 6/2008 | Usher | 210/747 |
| 2011/0315233 | A1 | * | 12/2011 | Carter | 137/14 |

* cited by examiner

Primary Examiner — Christopher Upton (57) ABSTRACT

An apparatus, method, and system for recovering oil from a submerged oil source, wherein the system includes a submerged conduit having at least two openings, with a first opening capable of being located in proximity of a leak in order to capture leaking oil, and with a second opening capable of communicating captured leaking oil to another location. A natural gas separator, coupled to the submerged conduit separates the boiling vapor phase natural gas from the captured oil thereby outputting oil with water contaminant. An oil/water separator coupled to the natural gas separator then separates out the contaminant water, resulting in a processed recovered oil product for storage and subsequent refinement. The flow to capture the leak is induced by generating a lower pressure at nozzle in the conduit via power jet, air lift, pumping of fluid out of conduit close to sea level, or other methods. Flow within conduit can become self-propelled if natural gas is present and creates an "air lift" effect as the natural gas expands at lower pressures closer towards sea level.

23 Claims, 10 Drawing Sheets

METHOD AND DEVICE FOR UNDERWATER RECOVERY OF PRODUCTS OR POLLUTANTS

REFERENCE TO RELATED APPLICATIONS

This application claims priority to provisional application Ser. No. 61/361,380, filed Jul. 3, 2010, entitled: "A METHOD AND DEVICE FOR UNDERWATER RECOVERY OF PRODUCTS OR POLLUTANTS," which application is also incorporated herein by its reference, in its entirety.

FIELD OF THE INVENTION

The present disclosure relates generally to the field of underwater recovery and in particular to the field of recovering submerged objects, materials or fluids.

DESCRIPTION OF THE RELATED ART

Land-based wells for petroleum products such as crude oil, natural gas, etc. ("oil") have been exploited for decades to seek the easiest and most productive sources. As national and world demand for oil has continued to rise, and as land-based sources have become insufficient, attention has been turned to other locations for petroleum reserves such as underwater, or submerged, wells in existence as early as the late-1800s.

If an uncontrolled rupture, discharge, or leak occurs in a submerged well or pipeline or any source of underwater oil, natural gas or other material, then various methods and equipment are used to recover the uncontrolled discharge. Detergents and dispersants, which act to chemically break up oil located on the surface of a body of water by dispersing the oil, e.g., making the oil settles to the bottom or improving the separation of the oil particles to prevent clumping. However, detergents and dispersants can be toxic in themselves, and they require manual extraction from the water. Bioremediation and bioremediation accelerators utilize microorganisms or biological agents that organically break down or remove the oil. Alternatively, an oil-spill containment-boom can be used to contain the spill by acting as a temporary floating barrier that concentrates the surface oil into a confined area for subsequent treatment. Skimmers are machines that separate top floating particles or liquid from a base liquid.

To recover underwater such as silt, or heavier and larger objects such as coins and other items from shipwrecks, cages and winches are frequently used to mechanically lift the objects to the surface in a time-consuming and awkward manner.

SUMMARY OF THE INVENTION

The present disclosure provides an apparatus, system, and method with several embodiments that overcome the limitations of the prior art. The present disclosure accomplishes this by providing a system of recovering oil from the source, such as a leaking submerged oil well or structure, and recovering virtually all of the leaking oil. This is accomplished independently and without interfering with the flow control or capping efforts of the well. Thus, the present recovery system can be performed in parallel with capping and flow control of the oil well. The system includes a submerged conduit for capturing leaking oil from the oil well via suction, or differential pressure that can be induced via several methods. The submerged conduit is coupled to a natural gas separator, if necessary, in the configuration of an inverted trap with a liquid check valve to divert the separated natural gas or other gaseous components. This resulting liquid mixture is then sent to an oil/water separator; then to an oil reservoir for storing the captured oil, e.g., an oil tanker. Alternatively, the resulting liquid mixture can be or captured and stored as an oil/water mixture and if no longer-term storage or transport is available then the oil and natural gas can be burnt or flared off, respectively, at the surface of the body of water.

In another embodiment, an apparatus to recover oil from submerged fluids includes a submerged conduit having at least two openings, with a first opening capable of being located in proximity of a leak in order to capture submerged fluid such as leaking oil or other liquid or gaseous material, and with a second opening capable of communicating captured leaking oil to another location. The fluids include crude oil, natural gas, and other petroleum products. The conduit includes a cylindrical conduit that is rigid, flexible, or a combination of rigid sections with flexible joints. The apparatus also includes a regulator coupled to the submerged conduit to control the flow rate of fluid therein, and an anchor system coupled to the submerged conduit for steering or holding the conduit to a desired location.

The present disclosure provides embodiments that fix submerged oil leaks that, if not contained at the source, can result in hundreds or thousands of square miles of polluted beaches, marshes and seafloor. Current methods and equipment can be very expensive, labor intensive, and time-consuming to provide damage. The consequences of any oil spill can be environmentally and economically disastrous, especially when an underwater solution does not exist and the spill continues to occur. If the seafloor is compromised by fractures near oil reserves or if wellhead or pipeline equipment is severely damaged it is extremely difficult to capture the oil/natural gas at the source. Alternatively, if an oil spill is partially captured at the water surface, the cost can be exorbitant, and the effectiveness and thoroughness is meager.

Advantages of the present disclosure include: recovery can be conducted in parallel with other recovery methods; inexpensive conduits such as polyvinylchloride (PVC) pipe or other reliable materials can be used for the majority of conduit; steel or aluminum materials can be utilized near the surface to resist damage in case of fire; substantially the entire leak can be captured; any type of leak can be captured, including multiple leaks by using multiple suction nozzles at bottom if necessary; the pressure aspect of clamping a blown out oil/natural gas well is delayed or reduced with the present system because low pressure differentials can be used, thereby allowing the use of lightweight and inexpensive materials; can be ready for deployment in matter of hours because of standardized system components, does not require excessive customization for a particular leak, other than size and length of conduit, and whether multiple conduits are needed; essentially eliminates damage caused by oil dispersion at the top of the body of water; eliminates or reduces the need for dangerous chemical dispersants as all the leak is captured at the source; reduces the danger of a second blowout as primarily low pressure differentials are involved and oil and natural gas are safer to handle if they are not under high pressures; low stress on this system even at great depths as the pressure differential across the conduit wall is low; surface water can be "preheated" and pumped through insulated pipe/hose attached to the entry point of the conduit recovery system very quickly, e.g., at 20 mph the heated water can arrive at bottom of a 5,000 feet underwater leak in 3 minutes; recovery conduit can be placed down-current from a leak, where the conduit can be held in position by stays and cables.

For this disclosure, the term 'gas' refers to a gaseous state of materials and not to a distillate of the oil, e.g., 'gasoline.' from the captured leaking crude oil. Thus, removal of gaseous state components from dredged liquid and solids leaves a resulting mixture of primarily oil, water, and other non-gaseous contaminants.

These and other objects and advantages of the present disclosure will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate one embodiment of the present disclosure and, together with the description, serve to explain the principles of the invention. It should be understood that drawings referred to in this description are not drawn to scale unless specifically noted.

DETAILED DESCRIPTION OF THE INVENTION

Reference will now be made in detail to the preferred embodiments in the present disclosure. Examples of the preferred embodiment are illustrated in the accompanying drawings. While the present disclosure will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present disclosure, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the present disclosure.

A. Functional Operation

Figure 1:
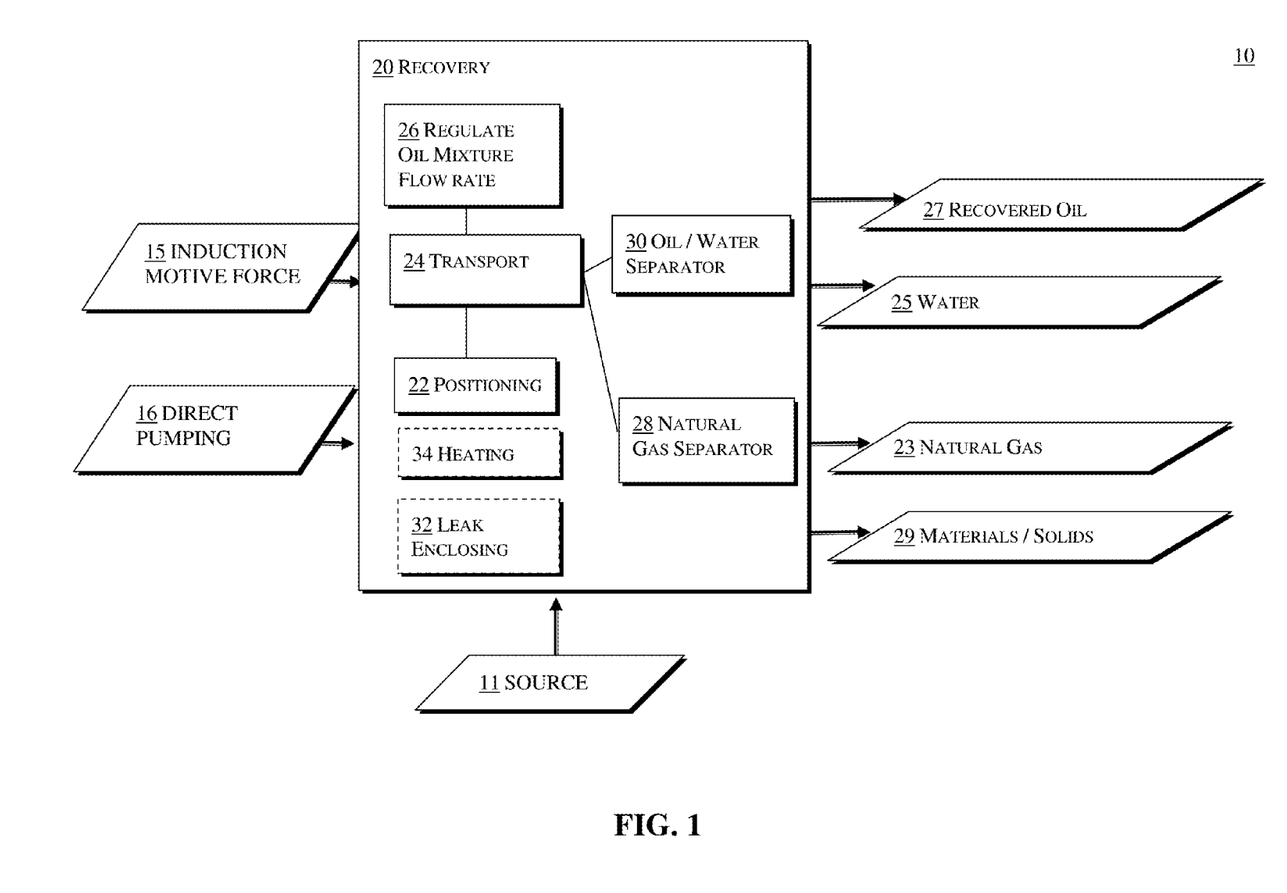
FIG. 1 is a functional block diagram of an oil recovery system to recover oil from a submerged oil well or its apparatus, in accordance with one embodiment of the present disclosure.

Referring now to FIG. 1, a functional block diagram of an oil recovery system 10 to recover oil from a submerged oil well, or the related oil well apparatus, is shown, in accordance with one embodiment of the present disclosure. The functions of FIG. 1 can be accomplished by a wide range of embodiments and means such as those means, at a minimum, provided in subsequent figures, and their equivalents as know to one having ordinary skill in the art. Oil recovery system 10 utilizes a recovery function 20 comprising: a transport function 24 in close proximity to the oil source 11 e.g., a leaking oil well, to various destinations. The transport function 24 can be accomplished by an induction motive force function 15, such as a power jet means or an air or gaseous state lift means that will thereby pump the liquid in the conduit nozzle near the source up the conduit to the desired location at the end of the conduit. The means for transport function 24 may be accomplished by a direct pumping function 16, such as a positive displacement pump, (e.g., gear, piston, vane, etc.) or centrifugal pumping means, (e.g., propeller, impeller, etc.) within the conduit, or any other means or combination of means that would effectively transport the fluid or solids desired to be transported. It is important to coordinate and regulate the flow rate between 1) the incoming oil mixture, and 2) the outgoing oil and natural gas components, e.g., into separators, pipelines, tankers, flare off, etc., in order to prevent excessive pressure or vacuum levels that would damage the conduit or other equipment. Pumps, air lifts, power jets, and other means of propelling fluid and solids through a conduit are referred to as propulsion units.

Positioning function 22 directs the transport function 24 to a location best able capture the target fluid, e.g., leaking oil at the source. The source 11 can be a submerged oil well, or its apparatus such as valving or plumbing, a pipeline or a natural geological feature such as a fissure to the earth's strata enclosing the oil field.

Figure 4A:
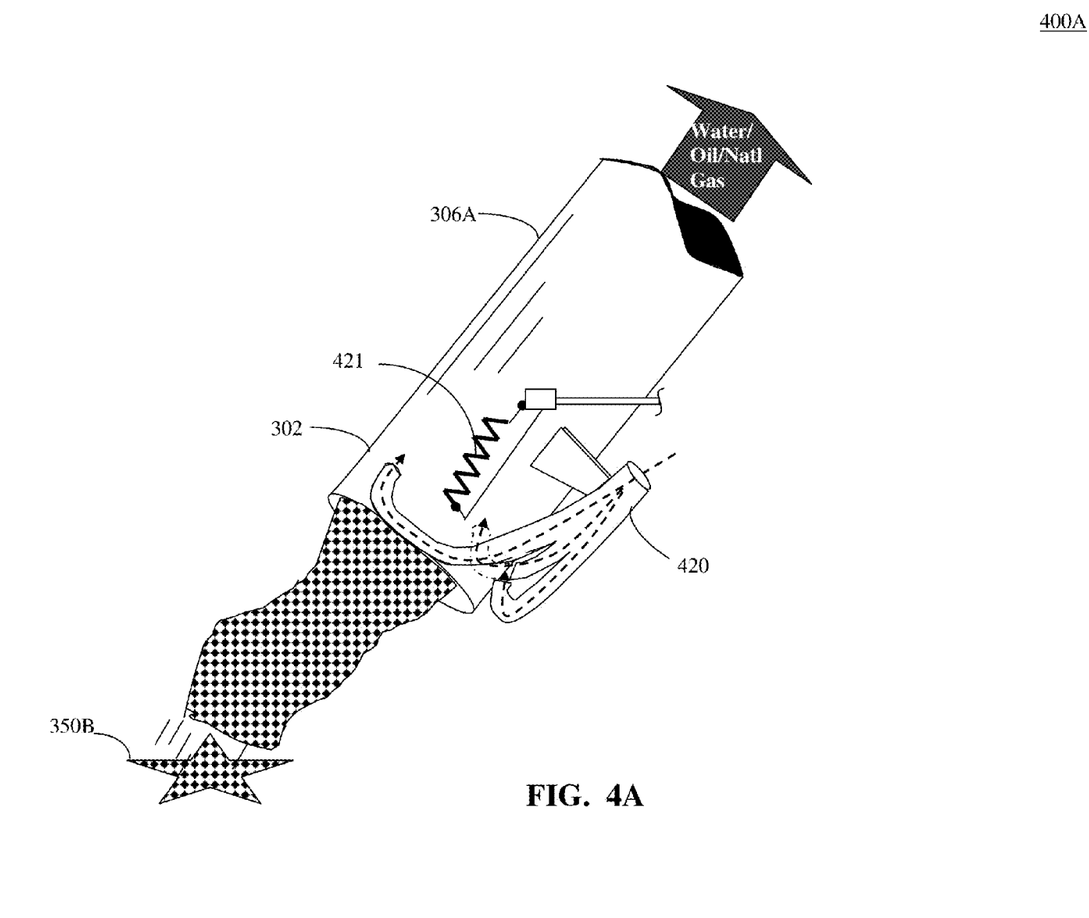
FIG. 4A is an illustration of a flow induction apparatus to an ingress portion of a conduit to recover oil from a submerged oil well or its apparatus, in accordance with one embodiment of the present disclosure.

Positioning function 22 can be augmented by an optional leak-enclosing or containment function 32 at the location of the leak, e.g., to increase the capture efficiency of the oil leak, and to decrease the dilution of the oil by water. In deep water, the oil/natural gas sources can leak solid methane hydrates formed from natural gas in cold temperatures and high pressures. These solid methane hydrates, if large enough, can jam a conventional oil pipe. The present disclosed embodiments can prevent the hydrate problem in several ways. First, the conduit can be fabricated from a wide range of materials, shapes, x-sections, diameters, etc. as described in FIG. 4. Second the conduit can be operated at approximate pressures that are slightly below or equal to the ambient pressure of a given depth of water where the leak is occurring, thereby avoiding higher pressures that would otherwise increase the likelihood of forming methane hydrates that would hamper recovery of target fluids. That is, the conduit is only exposed to a small differential pressure used to pump the recovered material, e.g., oil, up the conduit. Third, a heating function 34 can be implemented to prevent the formation of solid hydrates, e.g., via pumping warm or hot water to the suction nozzle of the conduit to warm the liquids inside the conduit thus liquefying the solid methane hydrates. The hot water pipe to the nozzle can be insulated to better retain heat.

The recovery function 20 also provides a function 28 of separating natural gas from the recovered oil, as well as a means of separating contaminants 30, such as salt water, fresh water, or debris, of the aqueous environment from the desired target, the leaked oil. The natural gas separator function 28 is necessary because natural gas, which may be a liquid at the higher pressures and colder temperature deep underwater, will change into a flammable gaseous state as it nears the surface of the body of water. The recovery function 20 provides an output function for the separated natural gas 23, an output function for the separated contaminants, such as water 25, and an output function for the recovered oil 27 into one or more processing centers for recovery and consumption or for bioremediation and/or disposal. If the leak/target fluid is deep enough it may be necessary to perform the separation function a distances slightly above the point of change of state to a gaseous material, to not generate too much air lift effect that could collapse the suction pipe lower down or rupture the pipe above. Also, if the percent of gaseous materials versus liquid in the conduit becomes too high it will generate a large buoyant effect similar to a ship hull that could potentially rip anchoring devices of the conduit from the sea/lake/river bottom. Also a high gaseous content of materials inside the conduit will transfer lower depth pressures upward if the conduit flow is restricted, e.g., for flow control, thus potentially rupturing the conduit near the surface from excessive pressure. One aspect of the present disclosure is to control pressure and specific gravity in the conduit to be compatible with the properties for surrounding water at the same depth. Thus, natural gas or other gaseous materials will be separated when they become too large a percent of the conduit fluids. The natural gas/other gases can be routed to surface via a dedicated conduit that can sustain the pressure; or the natural gas/other gaseous materials can be released into the water at that point in a regulated way, as natural gas is a minor pollutant, compared to petroleum, as it bubbles up and disperses into the atmosphere. If transported to the surface the natural gas can be flared off, routed to a pipeline or compressed for Liquid Natural Gas (LNG) tankers.

Oil/water separator function 30 provides for water output 25 that will be cleansed following the oil/water separation. Alternatively, oil/water separator function 30 can be an ad hoc implementation by pumping the oil/water mixture into an oil tanker that can perform the oil/water separation process naturally via gravity.

Regulation function 26 monitors pressures to prevent excessive vacuum inside the conduit, or excessive pressure outside the conduit, which could crush the conduit. Regulation function 26 also provides for monitoring of pressures to prevent excessive pressure inside the conduit from rupturing the conduit. The pressure monitoring and regulation function can occur at different locations along the conduit to accommodate the different pressure and fluid states of the system.

Alternatively, functional block 10 can be utilized as a dredge for recovering and outputting materials 29, such as sediment, or objects, such as coins or other recovery from shipwrecks. In this embodiment, separators for natural gas and oil/water mixtures, as well as a heating function, are not required, though the general principles of operation and system design are still applicable.

B. Method of Operation

Figure 2:
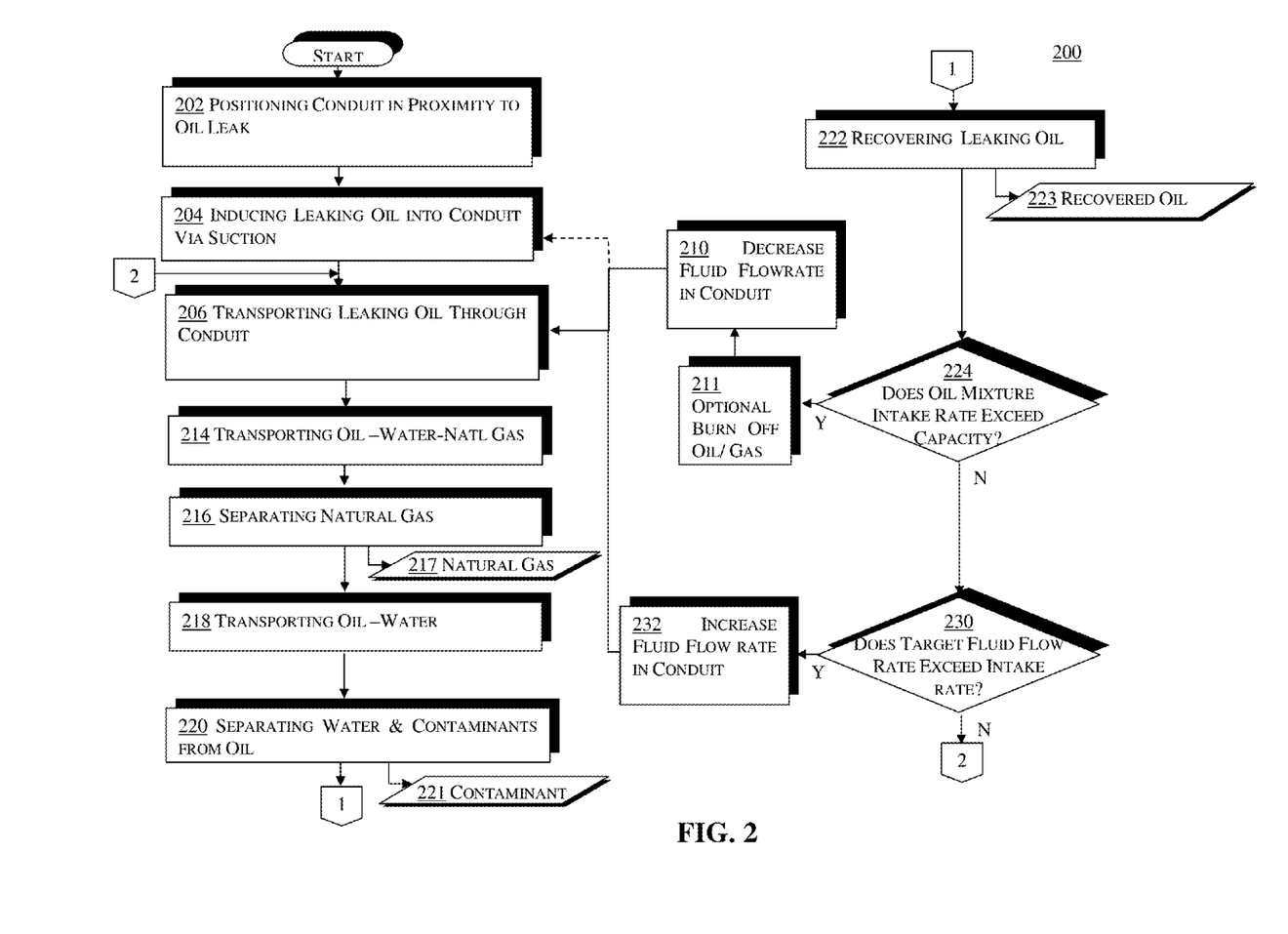
FIG. 2 is a flowchart of a process to recover oil in an aqueous environment, in accordance with one embodiment of the present disclosure.

Referring now to FIG. 2, a flowchart 200 of a process to recover oil in an aqueous environment is shown, in accordance with one embodiment of the present disclosure. Flowchart 200 can be implemented using exemplary embodiments illustrated and described in subsequent figures or other embodiments that satisfy the operations and functions described herein. Operation 202 positions the conduit by the oil leak so that the suction at the nozzle will capture most if not all of the leak. A direct connection to the source of the liquids sought to be recovered, e.g., the target fluids, is not required in order for these liquids to be captured by the suction nozzle. That is, the conduit needs to only be in reasonable proximity to a source of the discharge or leak of the target material, e.g., a leaking oil well, to effectively capture most of the leaking oil. The proximity required for effectiveness will be determined by empirical data on the scene of the recovery, and would include factors such as current intensity, diffusion of target material, thermal factors, etc. Thus, in one embodiment, the conduit would be within several inches of the source, and in another embodiment, the conduit can be several feet or more from the source, depending on criteria such as oil leak velocity, instability, desired recovery rate, suction efficiency of the conduit, etc. Effectiveness can be enhanced via shields placed around the leak to direct the leak into the nozzle with the least amount of surrounding water being also captured. Once the conduit is in position, operation 204 induces the leaking oil into the conduit wherein operation 206 transports the induced leaking oil through the conduit and its subsequent processing operations. The motive force can be placed in a singular or in multiple locations along the conduit. In operation 214, the leaking oil mixture of oil, water and natural gas is transported through the conduit to subsequent processing and separation operations.

In operation 216 the leaking oil mixture is processed to provide outputs of natural gas 217, which can be flared, transported, or stored, and the remaining oil and contaminant mixture which is then transported via operation 218 to a subsequent separation operation. In operation 220, the contaminant 221 is separated from the mixture and can be returned to the environment directly or with subsequent clean up processing operations. In operation 222, the desired target of recovered oil 223 is provided to a processing center that is a storage facility, such as oil tankers, an oil line to shore, etc. Operation 224 inquires whether the oil mixture induced intake rate into the conduit exceeds the capacity of the oil recovery system, with an affirmative response proceeding to optional operation 211, which can flare off excessive natural gas or oil at the surface of the body of water, and/or to operation 210 which regulates, e.g., decreases, fluid flow rate into the conduit via control feedback to apparatus used in operation 204, induction operation, and/or operation 206 transporting operation. A negative response to inquiry 208 proceeds to operation 230. Operation 230 inquires whether target fluid flow rate exceeds intake rate, e.g., whether a leaking oil well is leaking a higher rate of fluids than oil recover dredge is currently consuming. An affirmative answer to operation 230 proceeds to operation 232 that increases fluid flow rate into conduit by increasing pressure differential, or turning on additional conduits if provided in multiples. A negative answer to operation 230 proceeds to reenter flowchart 200 at operation 206, which maintains the current transporting of leaking oil through conduit.

C. System Operation

Figure 3:
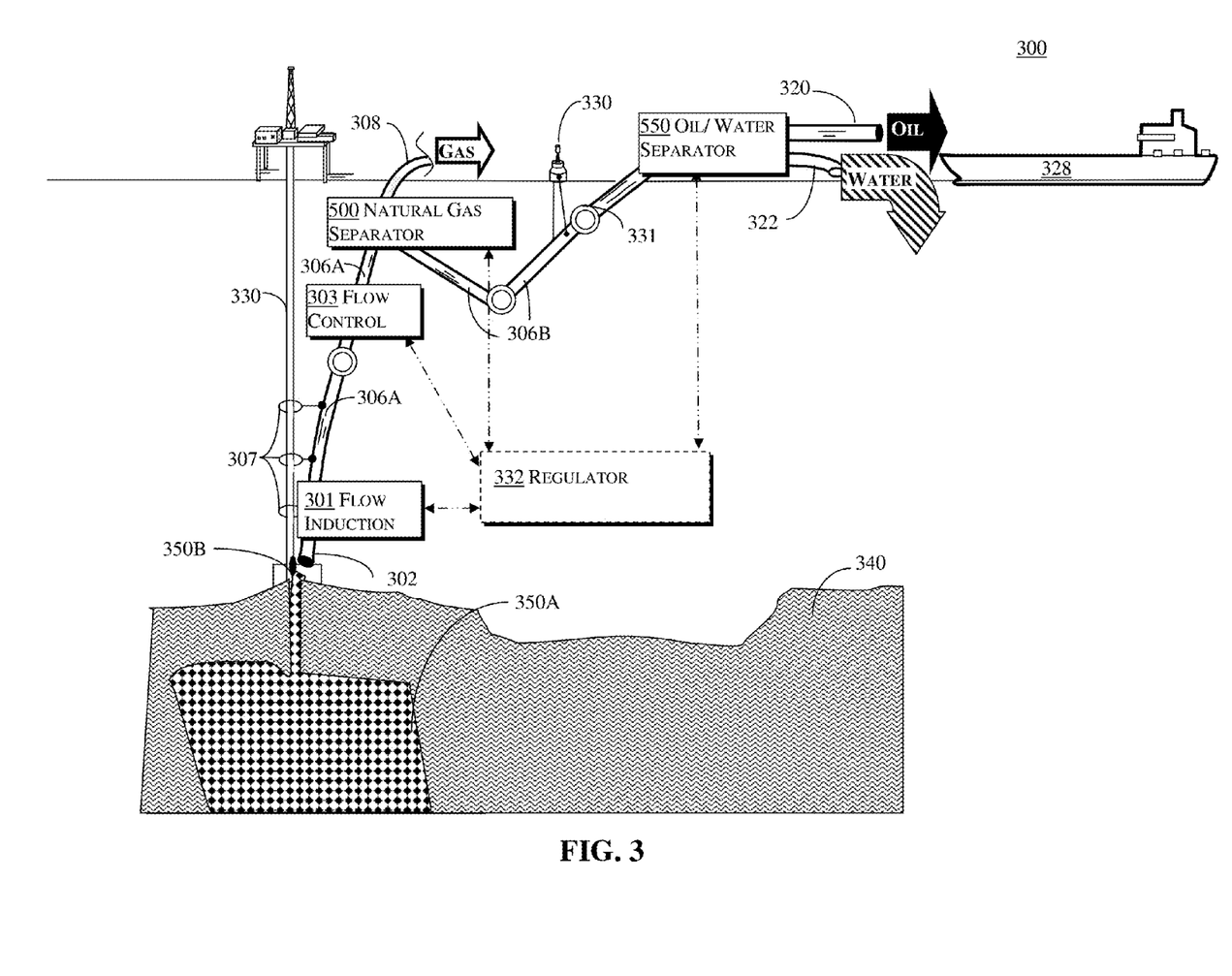
FIG. 3 is a schematic of an oil recovery system for a submerged oil well or its apparatus, in accordance with one embodiment of the present disclosure.

Referring now to FIG. 3, a schematic of an oil recovery system 300 for a submerged oil well or its apparatus, e.g., oil well pipe 330 is shown in accordance with one embodiment of the present disclosure. Oil field 350A is an oil-rich deposit in the strata of the earth 340. Oil recovery system 300 couples conduit apparatus 306A and 306B, with flow induction apparatus 301, which in turn is coupled to natural gas separator 400 having an output of natural gas from conduit 308. A variable valve/choke can be used to regulate the flow/pressure of the natural gas from conduit 308 to maintain a liquid level in gaseous materials/fluid separator 400 all intake point of natural gas exit to conduit 308, as shown in subsequent FIG. 5. Another variable valve/choke can be used to regulate the pressure/flow at the surface if natural gas is routed to the surface. Alternatively, natural gas can be released underwater near 308 origin after gas is separated. Industrial sensor to measure pressure, flow rate and gaseous material content percent that can be placed throughout the main conduit 306A and gaseous material only conduit 308 to monitor and optimize the operations of the present disclosure. Separator 400 is located below sea level in present embodiment, benefitting from higher head pressure, though separator 400 could also be located at sea level or higher. Conduit 306A can be positioned and positionally maintained near oil well source 350B by slidably coupling conduit 306A via one or more slide rings 307 to existing oil well piping 330.

Conduit 306B couples the output flow of oil and contaminants, sans natural gas, from natural gas separator 500, to water/oil separator 550 processing center that has a water conduit 322 and a conduit 320 for the recovered oil, which has been processed through both separators. Regulator 332 is coupled to communicate input and output (I/O) to and from any combination of components: oil/water separator 550, natural gas separator 500, flow control 303, flow induction 301, and oil offloading reservoir, e.g., tanker 328, etc., to provide flow control and regulation means for various flow rate processing capacities of each of these components. Flow control 303 is a valve or any mechanism that controls the flow of fluids from full throughput to a full closed condition, in conduit 306A and 306B, natural gas separator 500 and/or water/oil separator 550 altogether, e.g., for ceasing operation. Multiple instances of flow controls can be utilized along conduit 306A and 306B to regulate the flow of fluids at different stages along the oil recovery process. Other flow control equipment can be utilized to control the effluence of natural gas, contaminant such as water, and oil from the recovered oil/water mixture. A penstock valve can be used at the surface to prevent damage to the conduit. In addition to a close-off valve, one or more anti-hammer devices or pressure relief valves can be coupled to conduit 306A, 306B to reduce water hammer effects or excessive pressures, respectively, in order to prevent bursting or crushing damage.

D. Conduit Apparatus

Referring now to FIG. 4A, an illustration of a flow induction apparatus 400A to an ingress portion 302 of a conduit 306A to recover oil from a submerged oil well or its apparatus is shown, in accordance with one embodiment of the present disclosure. One or more induction port(s) 420, configured as a manifold in this embodiment but capable of separate ports, are coupled in an upward direction at first end 302, or ingress portion, of the conduit 306A, which said first end will be located by the target fluid, e.g., an oil leak from source 350B, oil well. Induction port(s) 420 receives pumped fluid, e.g., surrounding seawater or fresh water in which the oil well is located, to induce the suction of leaking oil 350B into first end 302 of conduit 306A. Alternatively, induction apparatus 420 can be configured to function as an air lift, by pumping air into conduit 306A, e.g., at end 302, or as power jet, by pumping high pressure fluid into the flow stream in conduit 306A, both inducing leaking oil from source 350B into conduit 306A.

As an air lift apparatus manifold 420 utilizes the release of gaseous matter that rises to the surface of the submerged environment, e.g., a lake or ocean, and thereby induces, or pulls, the liquid along with it. Thus, when configured as an air lift apparatus compressed air can be released into the first end 302 of conduit apparatus 306A, the gas bubbles will travel upward through conduit 306A, pulling the leaking oil liquid with it, to natural gas separator 400 of FIG. 3, where the air bubbles will mix with evaporating natural gas and be bled off, thereby leaving the mixture of the recovered leaking oil, water, and the contaminants. If there is a natural gas component or any flammable gaseous component coming from the source, then the air lift mechanism preferably uses air such as an inert or non-flammable gaseous material such as nitrogen or oxygen-depleted exhaust gas in order to make the gases in conduit less flammable and less dangerous. At very deep depths, an air lift or natural gas lift create a pressure imbalance across the conduit 306A, 306B as gas expands and reduces the specific gravity, and potentially causes excessive velocity, both of which might damage the conduit. In this deep-water scenario, gas is injected for the air lift at a location closer to the top of the water, or the gas injection can be regulated in one or more injection locations along conduit 306A, 306B.

A heating apparatus can be used to prevent methane hydrate formation. However at very deep levels underwater, such as 5,000 feet of depth, methane can become a solid, e.g., methane hydrate, when in contact with water, and this solid can clog a pressure or suction conduit that is attempting to move the natural gas or oil/natural gas mixture to the surface. Thus, induction apparatus 420 can be configured to provide heated water to intake end 302 of conduit 306A to both melt the methane hydrates and assist creating suction at the nozzle of the conduit. In addition, alcohol or other forms of antifreeze can be pumped down to manifold 420 to melt the hydrates without heat. Alternatively, heated antifreeze fluids can be pumped to the manifold 420. An alternative embodiment can electrically heat the nozzle 302, e.g., with an electrically resistive element 421. Any of the above methods and apparatus may be used in a wide variety of combinations to meet a particular application's needs.

The use of Computational Fluid Dynamics (CFD) can be effectively utilized to design the particular conduit and nozzle size, shape, and orientation for a particular leak/situation. Whether custom fabricating for a situation or having a prebuilt generalized unit the preferred embodiment is to use CFD to stimulate the capture of the leak before actually attempting to capture the leak. Thus, problems can be solved before they arise and fine-tuning can be done before implementation. Every aspect of the present disclosure can be accurately stimulated with CFD systems available as the filing of this patent application if the facts/data about the leak are available prior to the attempt of physical implementation greatly enhancing safety and efficiency.

A major advantage of this system is that after the flow has been induced and if there is a natural gas component in the leak, the present embodiment can become self-propelling. As the natural gas rises, whether or not it starts as a solid, liquid or gaseous state, it will become a gaseous material in shallower water and generate it own "air lift" effect. Thus, a valving mechanism such as a butterfly valve can be used to slow down the flow if it becomes too high. A video or infrared (IR) camera 444 can be mounted near the nozzle to adjust vacuum to the correct amount to capture the entire leak but restrict it from becoming too high that it collapses the conduit. Pressure and flow rate meters can be placed inside the conduit to monitor the system and provide adjustments. An automated system controlled by a computer utilizing the various feedback instrumentation, such as pressure, flow rate, capacity levels, etc., can streamline the operation. Conduit 306A, 306B can be a wide range of diameters, e.g., less than one foot to more than ten feet in diameter, of pipe/hose or other conduit material or construction that will inherently prevent jams. A plurality of conduits can be combined together for a scalable combined effect where nozzle ends can be coupled or dispersed to cover a wider area by the leak source 350B. For example, the capacity of a two-foot conduit at 5 mph speed and 75% water and 25% oil will transport about 41,000 barrels of oil per day (BOPD). At 5 mph and 50% oil content, a capacity of about 82,000 BOPD can be reached. Thus at 5 mph a 2 foot conduit is large enough to capture more than 100% of the oil of a 40,000 BOPD leak if there was 75% water dilution. The conduit diameter and x-section shape can vary to any combination of shapes and sizes that would provide sufficient strength, ease of assembly and use, and conduciveness to pumping the target material, e.g., leaking oil and natural gas. In one embodiment, the diameter of the conduit increases from the lowest part to the upper parts of the conduit to a higher or more downstream section, thereby inducing the flow via a potentially lower pressure and also accommodating the increase in volume of the target material as gaseous materials comes out of solution, etc. However, any size or gradient of size of the conduit can be used to transport the target fluids to their destinations, within reasonable application limits. The conduit can be any combination of rigid and/or flexible conduit sections coupled by flexible joints 331, e.g., flex-line, ball joints, corrugates flexible lines, flexible conduit, etc. Internal stiffeners or vanes can be used to control location and movement of conduit and stress from opposing forces such as currents, etc. The conduit can include flow and pressure sensors at one or more locations along any portion of the conduit in the system for purposes of maintaining successful operational characteristics and for identifying any potential problem arising or existing failures in the system Flow of the target material, e.g., leaking oil, inside the conduit can be controlled using any kind of valving apparatus, e.g., valves such as butterfly, gate, ball, etc. To prevent any hammer effects from the momentum of the flow of material being shut off, an optional pressure/vacuum relief valve and/or a water hammer arrestor(s) can be placed anywhere along the conduit.

Figure 4B:
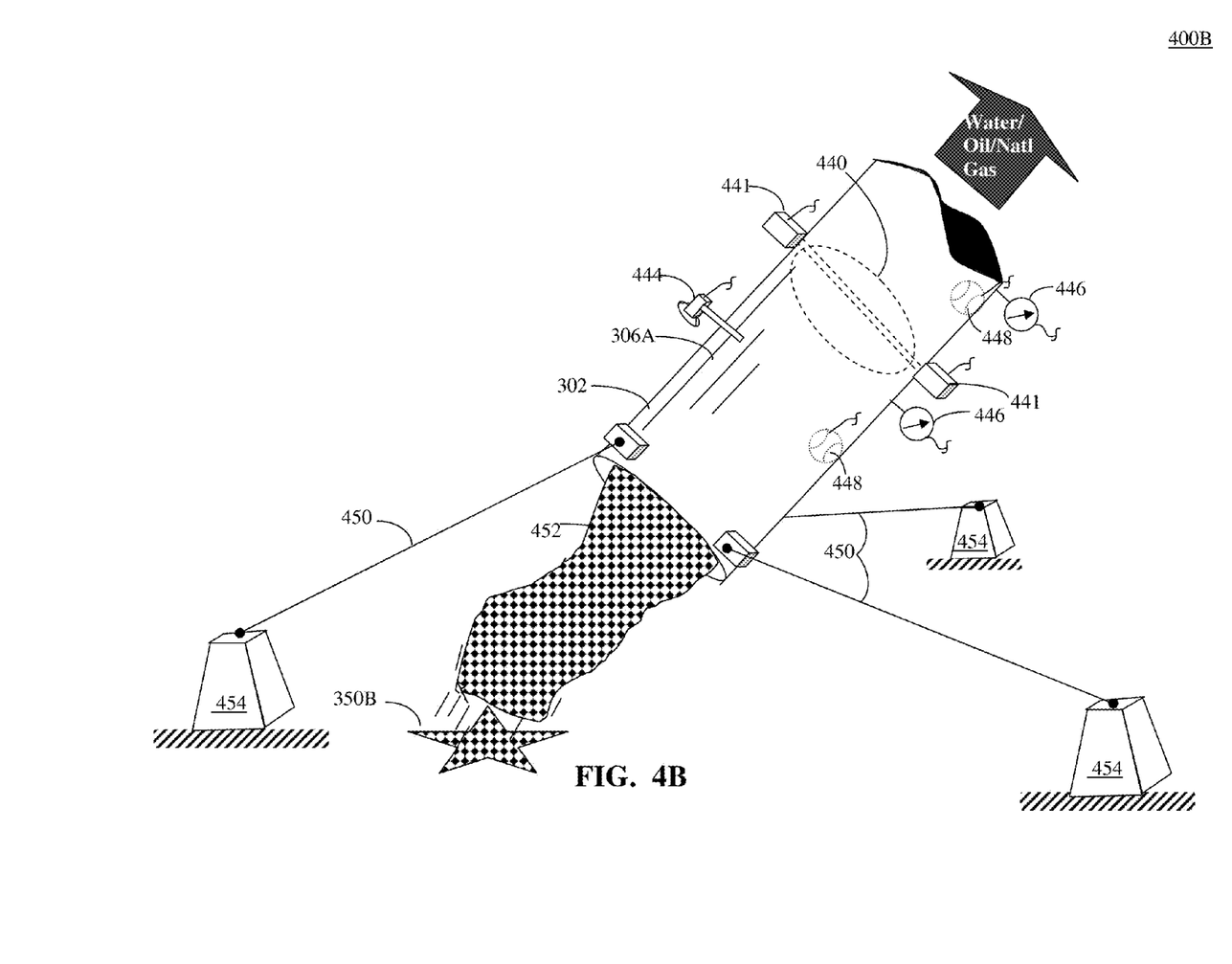
FIGS. 4B, 4C, and 4D are an illustration of a conduit positioning system to move conduit in proximity of a leaking oil well or the source of a fluid to be recovered, in accordance with one embodiment of the present disclosure.
Figure 4C:
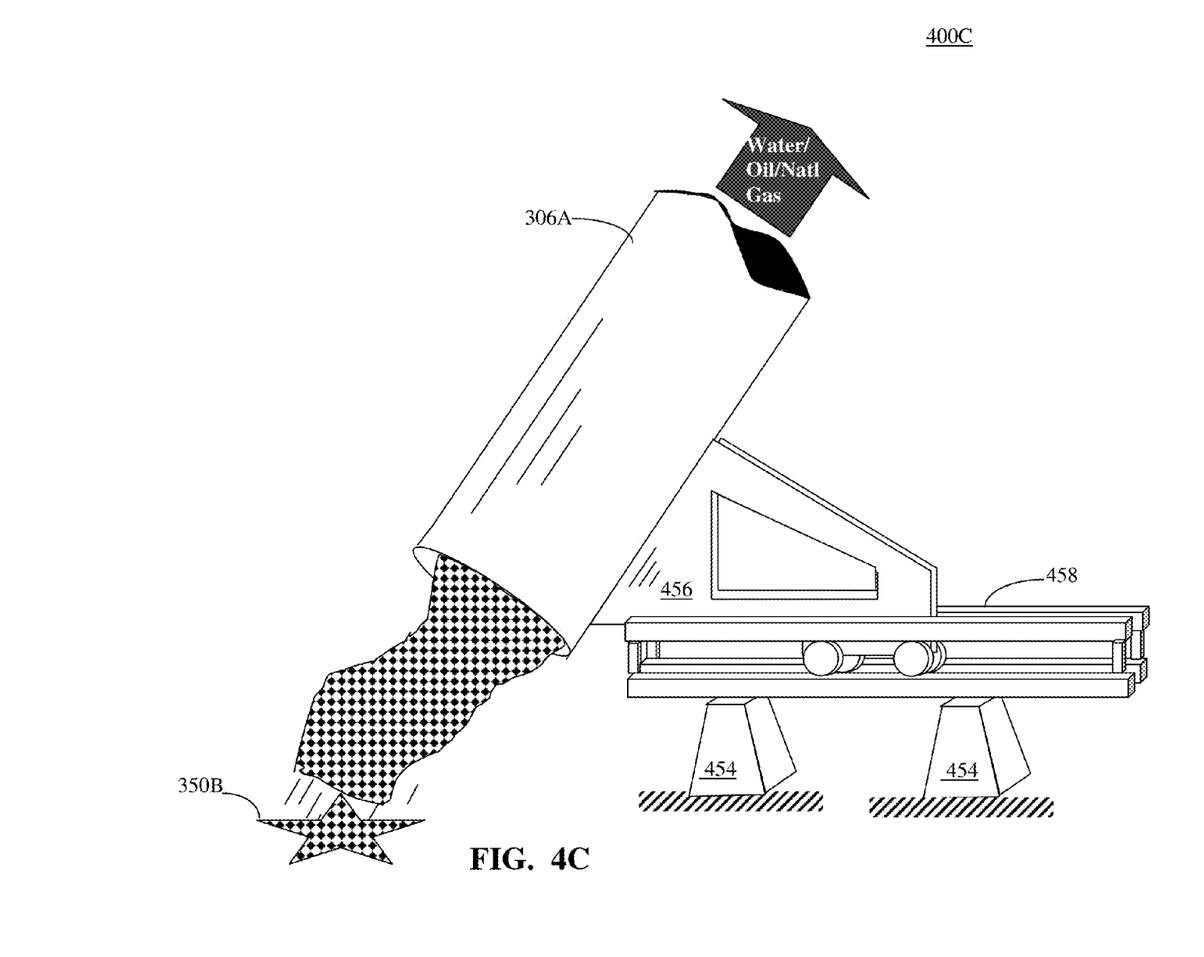
Figure 4D:
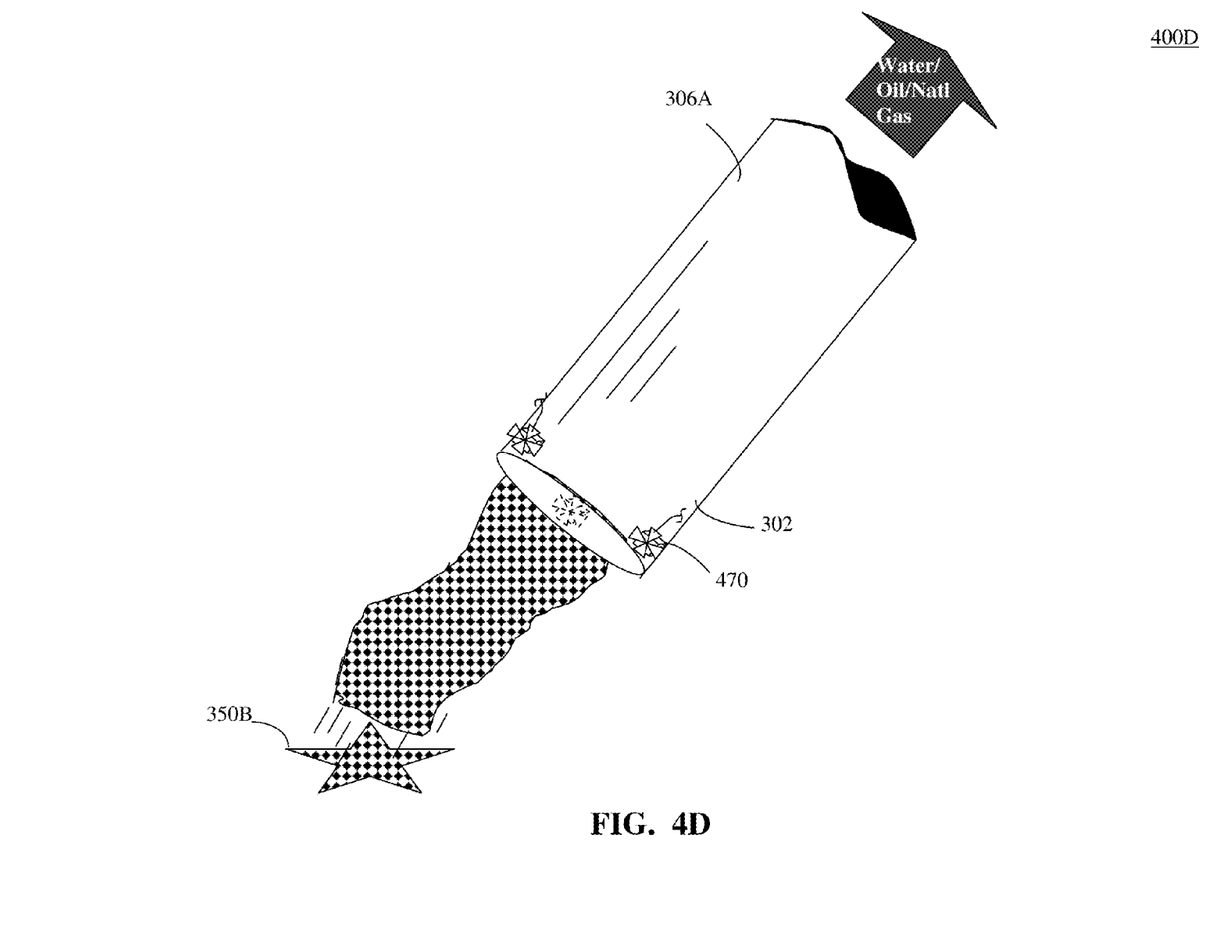

Referring to FIGS. 4B, 4C, and 4D an illustration of a conduit positioning systems 400B, 400C, and 400D, respectively, to move conduit within the proximity of a leaking oil well or the source of a fluid to be recovered, is shown in accordance with one embodiment of the present disclosure. In FIG. 4B, anchors 454 are tied via cable 450 to attach points 452 on ingress portion 302 of a conduit 306A, to place ingress portion 302 close to oil leak source 350B. One or more pressure gages 446 and/or flow gages 448 can be located at intermittent or regularly spaced locations along conduit 306A and 306B, and remotely coupled to surface observation personnel for purposes of measuring the health and status of the conduit system 400B, for providing alarms, and for shut down compliance. Butterfly valve 440, controlled by one or more motor positioners 441 and coupled to regulator 332 of FIG. 3, can be utilized to assist in controlling the flow rate of mixture through conduit 306A and 306B. There are many ways to position the suction nozzle that can be utilized including mounting to an articulating hydraulic arm that is anchored to the sea/lake/river floor near the leak source 350B allowing precise and quick maneuvering of the suction nozzle.

In conduit positioning system 400C of FIG. 4C, a bracket 456 is coupled to conduit 306A, which assembly is translationally coupled to a rail system 458 stabilized by anchor weights 454 to the floor of the body of water. System 400C is able to move linearly in at least one degree of freedom in the present disclosure. In another embodiment, a second set of orthogonal rails and rollers can be coupled to the existing structure to provide another dimension of movement. Bracket 456 can be translationally coupled to conduit 306A to provide a third, or vertical, axis of motion. For long-term operations, a system such as 400C can be provided for the continual adjustment of the conduit 306A for optimal capture of leaking oil. Alternative embodiment positioning system 400D is shown in FIG. 4D, wherein electrically or hydraulically-powered thrusters 470, e.g., water pumps, are positioned along various locations on the conduit 306A to effect movement of conduit end 302 to position it for best chances of recovering the leaking oil and other fluid source.

All the above positioning systems can be coupled to a feedback loop either using a metric such as the capture efficiency of the oil, or using a video/IR camera feedback to manually or automatically adjust the position of conduit 306A to best capture the leaking oil.

A major advantage to this the present disclosure is that it can be constructed and operated in parallel with other recovery methods and there is great flexibility in how it can be deployed. The nozzle can be placed over a wellhead, or if there is still an existing production/recovery pipe, the nozzle can be deployed from the side without affecting other containment methods. It can easily be moved away from an oil well as well. The present disclosure can recover fluids from any source such as an internally leaking wellhead, a blowout around the wellhead, pipelines, and natural geologic ruptures of oil/natural gas. This flexibility is attained because no direct mechanical/pressure connection is necessary. The suction nozzle can capture oil/natural gas overhead, sideways, even upside down. For example, if an oil tanker were to sink with millions of barrels in its hold but leaking from a hole in the hull the disclosed recovery system could capture that oil.

E. Natural Gas Separator

Figure 5:
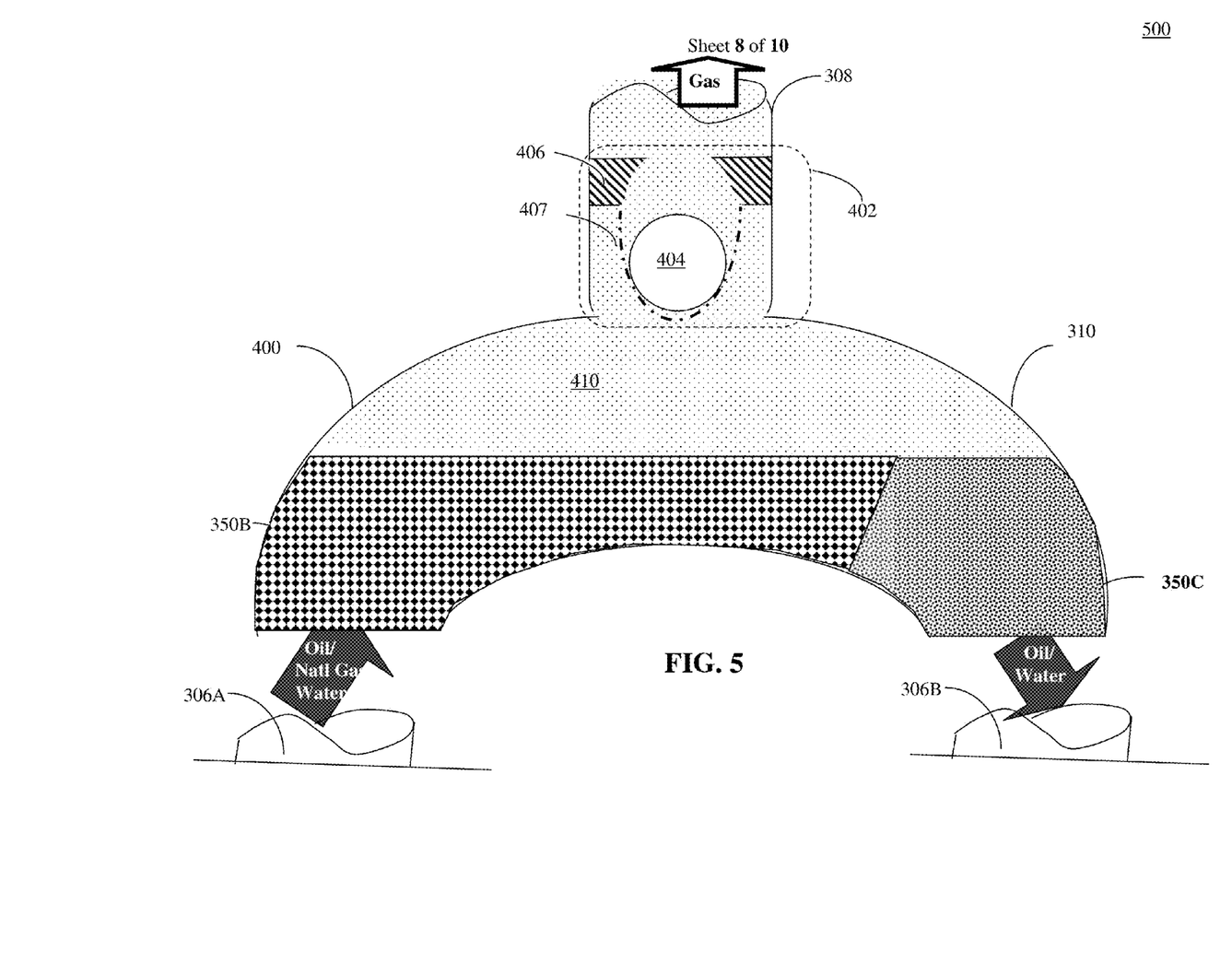
FIG. 5 is a cross-section illustration of a natural gas separator to accommodate natural gas as it boils out of the recovered oil at higher elevations in the submerged environment, in accordance with one embodiment of the present disclosure.

Referring now to FIG. 5, a cross-section illustration of a natural gas separator 500 to accommodate natural gas as it boils out of the recovered oil at higher elevations and less pressure, in the submerged environment is shown. The natural gas, or other gaseous materials in the captured fluids, are in a liquid or compressed-gas state when under high pressure, such as in the submerged oil well with high hydrostatic pressure acting on it. However, upon being pumped out by the present method, the leaking oil from the oil well, with liquid natural gas constituent, will be induced and/or pumped up towards the surface of the body of water, to a level at which the hydrostatic pressure is approximately equivalent to the vapor pressure of the natural gas. At that point, the natural gas will boil or evaporate into a gaseous state. The natural gas can be flared off or captured for subsequent processing or storage. In another embodiment, the natural gas is separated from the crude oil at a depth whereby it is still liquefied directly in separate high-strength conduit to pipeline/LNG tanker thus avoiding the operation of compressing it to transport it.

Natural gas separator 500 includes an inlet conduit 400, coupled to conduit 306A, an outlet conduit 310 coupled to conduit 306B, and a riser 308 coupled to both inlet 400 and outlet 310. Together these components form an inverted 'U' shape, or inverted trap, that will allow the gaseous state materials to rise to the top and the liquid to remain at the bottom portion of the 'U.' Conduit 308 is coupled at the top of the inverted trap 310 to vent gaseous state materials. The remaining mixture of recovered leaking oil and contaminants 350C is transported to the next stage, the oil/water contaminant separator 550, via conduit 306B A liquid check valve 402 is provided in natural gas separator 500 to ensure only gaseous components 410 egress through conduit 308 for flaring and to prevent liquid from egressing through conduit 308. Liquid check valve 402 can be any apparatus that allows passage of gaseous state materials, but prevents passage of liquid. In one embodiment, a floating ball 404 contained in wire cage 407 will seal in seat 406 if raised by liquid level inside natural gas separator 500 to prevent the passage of a liquid. If this occurs, the desired passage of gaseous components will continue once liquid levels recede to unseat floating ball from seat.

F. Water/Oil Separator

The remaining mixture of recovered leaking oil and contaminants 350C is transported via conduit 308 to contaminant separator 550. Within contaminant separator 550, the primary contaminant of water is separated out and discharged through conduit 322, leaving the processed recovered leaking oil to be discharged through conduit 320 for storage into tankers, pipeline to shore, or subsequent processing. The present disclosure utilizes embodiments of oil/water separators that are known to those skilled in the art, e.g., a separator tank.

G. Oil Buoy

Figure 6:
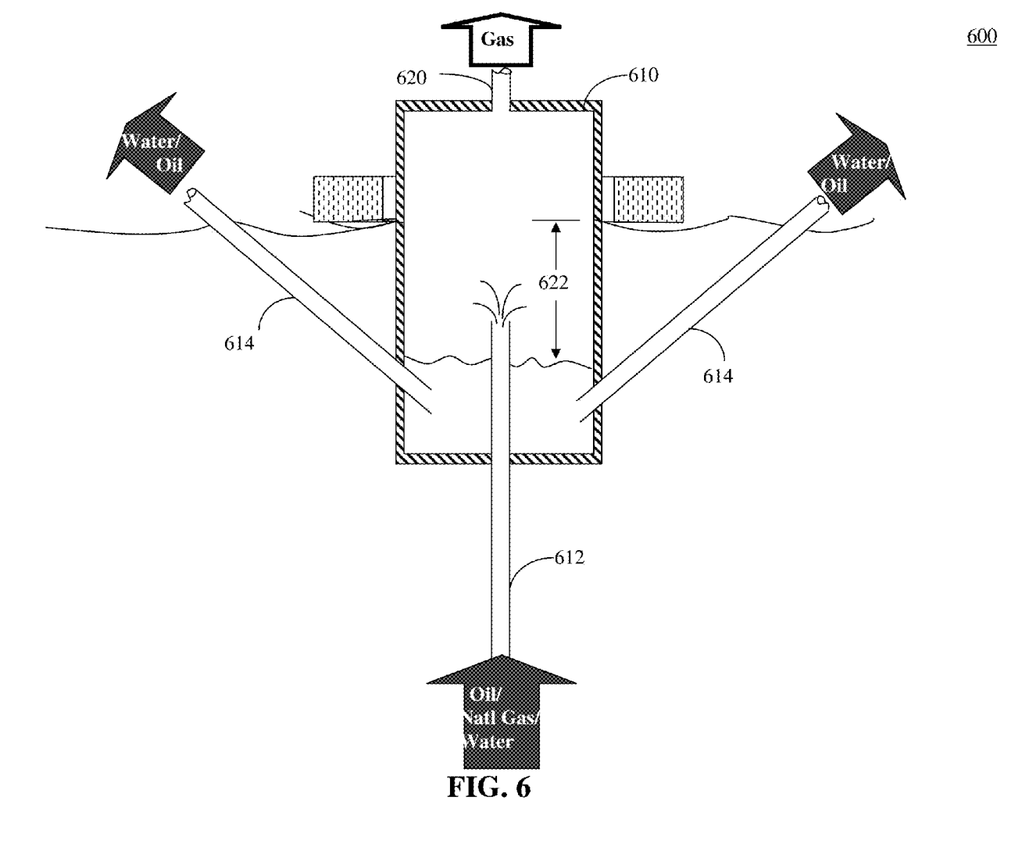
FIG. 6 is a cross-section illustration of a natural gas separator buoy for separating fluids near the surface, in accordance with one embodiment of the present disclosure.

An oil buoy system 600, shown in FIG. 6, can be used as a processing center to help recover target fluids located in a body of water. At the surface, an "oil buoy" embodiment of a processing center would allow the conduit to directly empty its contents into a buoy that would allow the level of oil/water located below, at, or above the surface of the water. This will provide a penstock effect if flow becomes too high, slowing that flow by rising it above the water level of the body of water in question. In addition, it would allow the direct pumping of the oil water thus creating a hydrostatic imbalance at the suction nozzle inducing flow. If the oil/water in the "oil buoy" were submerged below sea level, e.g., 50 feet below water level, it would generate an equivalent amount of negative head, or suction, e.g., 50 feet of negative head, at the nozzle, since liquids are essentially incompressible. If excessive suction were generated via natural gas "air lift" effect if the oil/water were to go 75 feet above the surface of the water in the oil buoy it would have an arresting effect without generating water hammer problems. The oil buoy can also be used to separate water, oil and natural gas. FIG. 6 is a cross-section illustration of an oil/natural gas separator buoy body 610 for separating fluids near the surface. Similar to FIG. 5, the oil/natural gas/water mixture enters the buoy body 610. The natural gas bubbles out the top through a vent 620 to be flared off, or recovered as liquefied natural gas. Water and oil is pumped out of the buoy via pipes 614 that are located in the bottom portion of the buoy 610 where the liquids settle. Height difference 622 between the fluid level in the buoy 610 and the surface of the body of water provides a differential pressure, or head, on the oil/natural gas/water influent via conduit 612, which can be coupled to conduit 306A thereby creating the negative head at nozzle end 302 for suction.

H. Dredging Solids

Figure 7:
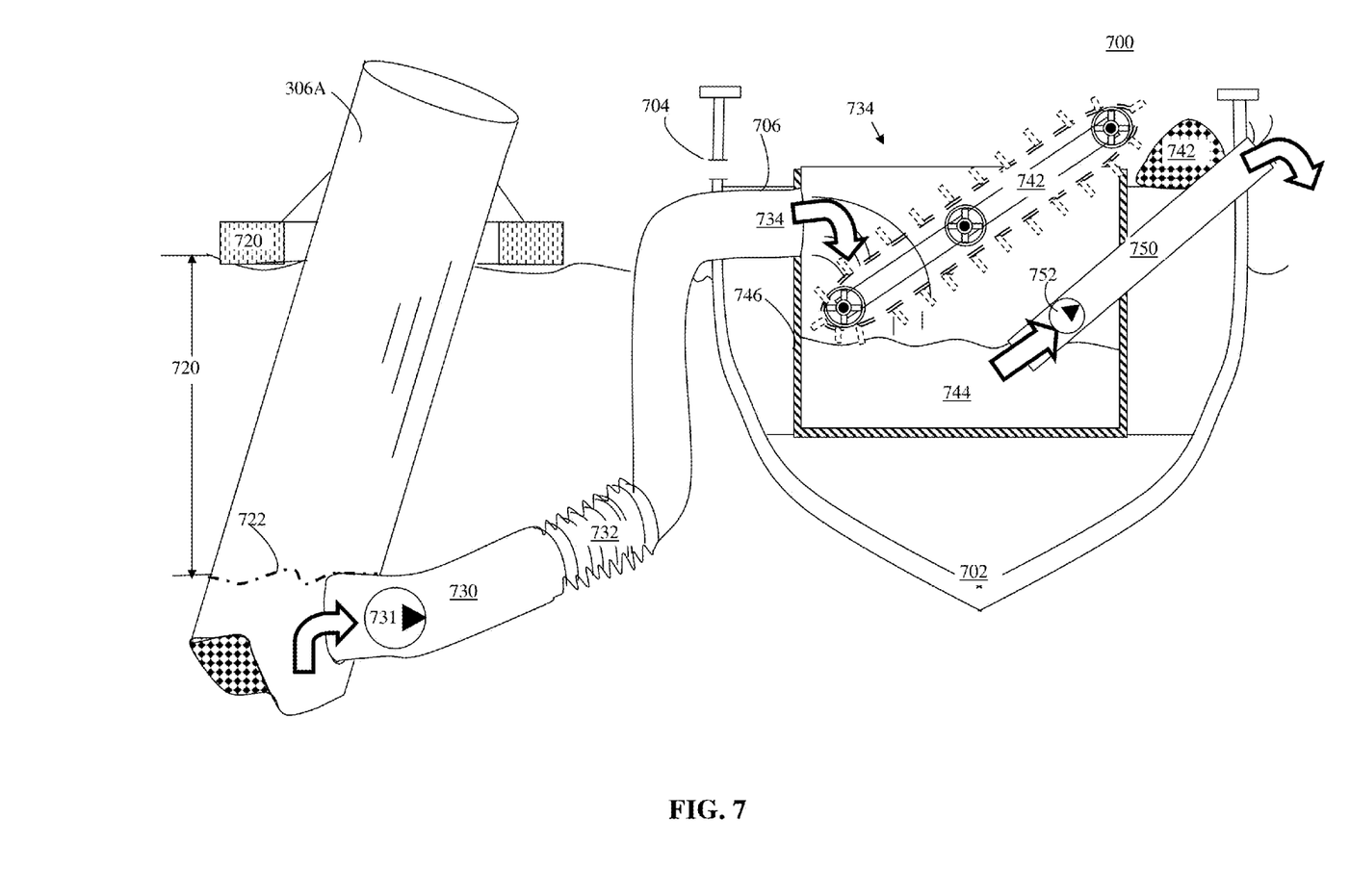
FIG. 7 is a dredging system 700 for solids, in accordance with one embodiment of the present disclosure.

Referring now to FIG. 7, a dredging system 700 for solids is illustrated, in accordance with one embodiment of the present disclosure. System 700 utilizes a conduit 306A with a top end retained at the surface using a buoy 720 that can be free-floating, anchored or tethered to a ship or platform. Top end of conduit 306A extends above sea level to contain surge effects. A transfer pipe 730, with optional corrugated flex-line section 732 is coupled at one end to conduit 306A at head distance 720 below sea level. The other end of transfer pipe 730 is coupled to screening system 740 located in ship 702 as a mobile processing center. Pump 731 is located at or below the head distance 720 to pump water from conduit 306A into screening system 740, thus maintaining water level in conduit 306A at level 722. Whatever level the water is maintained in conduit 306A an equivalent amount of negative head is created at the lower suction end of conduit 306A (not shown here). By locating pump 731 below sea level, both inlet and outlet of pump 731 are under higher pressure than if pump 731 was located at sea level, thus reducing cavitation effects. In the present embodiment, screening system 740 is includes a containment vessel 746, with a porous conveyer belt system 742 and a drainpipe 750 with pump 752 for scavenging containment vessel 746 and pumping filtered water 744 over the side of ship 702. When water is pumped into containment vessel at discharge end 734 of transfer pipe 730, it falls through porous conveyor belt 742, e.g., made of metal wire mesh, and falls into bottom of containment vessel 746 at filtered effluent 744. Top of containment vessel 746 is located above sea level, and thus should not flood. However, if containment vessel 746 does flood, deck 706 and gunwale vents 704 of ship 702 allow for spillover of fluid into the sea. Pumps 731 and 752 can be centrifugal, positive displacement, or water jet pumps, depending upon the type of contaminant pumped up in the conduit 306A.

Dredging system 700 can utilize other forms of pumping or lifting action in addition to the transfer pipe pump. For example, an air lift can also be utilized to help provide a buoyant effect and create upward momentum for the fluid and objects contained within conduit 306A. Additionally, a water jet could also be used at any length of conduit 306A to create additional pumping action.

While FIGS. 1-6 focus on an application for recovering submerged fluids, such as leaking crude oil from a ruptured wellhead, many of the apparatus and methods used therein can be adapted for use in dredging other materials, such as submerged solids. For example, features described for recovering submerged fluids, such as conduit end location and mobility, heating element function, regulation of conduit flow; and propulsion unit operation, etc. can be applied to recovering submerged solids.

I. Alternative Embodiments

The present description is applicable to a wide variety of applications and is not limited to any particular type of spill, accident or capture of valuable underwater liquids and gaseous materials.

Some portions of the detailed description, e.g., the processes, are presented in terms of procedures, function blocks, processing, and other symbolic representations of operations on fluid handling and processing. These descriptions and representations are the means used by those skilled in the art of environmental and petroleum engineering to most effectively convey the substance of their work to others skilled in the art. A process, operation, or function block, etc., is herein, and generally, conceived to be a self-consistent sequence of operations or instructions leading to a desired result. It should be borne in mind, however, that all of these terms are to be interpreted as referencing physical manipulations and quantities and are merely convenient labels to be interpreted further in view of terms commonly used in the art. Unless specifically stated otherwise, as apparent from the following discussions, it is understood that throughout the present disclosure, terms such as "positioning," "inducing," "pumping," "coupling," "separating," "processing," "recovering," "or the like, refer to the action and processes of handling petroleum products and associated contaminants, sediment, and other materials or objects capable of being dredged.

The foregoing descriptions of specific embodiments of the present disclosure have been presented for purposes of illustration and description. They are not intended to be exhaustive or to limit the invention to the precise forms disclosed. Naturally, many modifications and variations are possible in light of the above teaching. The embodiments were chosen and described in order to best explain the principles of the invention and its practical application, as demonstratum, to thereby enable others skilled in the art to best utilize the invention and various embodiments with various modifications as are suited to the particular use contemplated. It is intended that the scope of the invention be defined by the Claims appended hereto and their equivalents.

I claim:

1. An apparatus to recover submerged material from a fluid reservoir, the apparatus comprising:
a conduit having a first opening capable of being located in proximity of a target in the reservoir in order to recover the submerged material, and having a second opening exposed to ambient air, wherein the conduit is capable of transporting the submerged material; and
a transfer pipe, coupled to the conduit proximate to the second opening of the conduit for transporting material out of the conduit; and
a pump disposed with the transfer pipe for pumping fluid or submerged material through the transfer pipe.

2. The apparatus of claim 1 further comprising:
a regulator coupled to the submerged conduit to control the flow rate of the submerged material through the conduit.

3. The apparatus of claim 1 further comprising:
one or more valves coupled within the conduit for controlling flow of the submerged material within the conduit.

4. The apparatus of claim 1 wherein
the transfer pipe is coupled to the conduit proximate to the second opening at a distance below sea level in order to create at the first opening of the conduit negative head approximately equivalent to the distance below sea level at which point the transfer pipe is coupled to the conduit.

5. The apparatus of claim 4 further comprising:
a propulsion unit coupled to the conduit, wherein the propulsion unit is one of an air lift, a power jet, a centrifugal pump, or a positive displacement pump.

6. The apparatus of claim 1 further comprising:
a heat source proximately coupled to the first opening of the conduit, the heating source for preventing clogging of conduit with frozen submerged material influent into conduit.

7. The apparatus of claim 6 wherein the heat source is an electrically resistive heating element or a nozzle disposed at the first end of the conduit, wherein the nozzle is configured to discharge heated fluids into the conduit.

8. The apparatus of claim 1 further comprising:
an anchor system coupled to the first opening of the conduit for holding or steering the conduit relative to a desired location.

9. The apparatus of claim 1 further comprising:
a plurality of means for pumping fluid through the conduit and transfer pipe disposed at different locations on the conduit or the transfer pipe.
an anchor system coupled to the second opening of the conduit for holding or steering the conduit relative to a desired location.

10. A system for dredging submerged material, the system comprising:
a conduit apparatus having a first opening at a first end and a second opening at a second end, for communicating submerged material to the surface of a body of water;
a processing center for receiving the effluent from the conduit;
a transfer pipe, coupling the conduit to the processing center, for transferring the submerged materials to the processing center;
wherein the transfer pipe is located a distance below sea level in order to create suction at the first opening of the conduit with a negative head approximately equivalent to the distance below sea level of the transfer pipe; and
wherein the second opening of the conduit is open to ambient air.

11. The system of claim 10 further comprising:
one or more gas separators coupled to the conduit for removing gas.

12. The system of claim 11 further comprising
an oil/water separator coupled to the conduit for separating the effluent into water and oil, wherein the water is returned to the body of water, and the oil is retained for subsequent processing for consumption or bioremediation.

13. The system of claim 12 further comprising:
a regulator coupled to the one or more gas separators and the oil/water separator in order to regulate flow of influent into conduit to match a processing capability of natural gas separator and a processing capability of oil/water separator.

14. The apparatus of claim 11 further comprising:
wherein at least one of the gas separators is disposed at a level approximately equivalent to a pressure where a submerged material pumped into the conduit changes from a liquid to a gas.

15. The system of claim 10 further comprising:
an oil reservoir coupled to the conduit for storing captured leaking oil.

16. The system of claim 10 further comprising:
a screening system for capturing solids discharged from effluent from the conduit; and
a scavenge pump coupled to the screening system to remove liquids from the effluent.

17. A method of dredging submerged materials comprising:
positioning a first end of a conduit in proximity to a target to be dredged;
pumping submerged materials out from the conduit by a pump disposed proximate to the second end of the conduit;
transporting submerged materials from the conduit to a processing center;
separating components of submerged materials using one or more separators; and
exposing the second end of the conduit to ambient air.

18. The method of claim 17 further comprising:
transferring flow from the conduit to the processing center via a transfer pipe located a distance below sea level of the transfer pipe, the distance below sea level being equivalent to a negative head created at the first end of the conduit.

19. The method of claim 17 further comprising:
separating gas from the submerged materials in the conduit using the one or more separators, wherin at least one of the separators uses an inverted trap.

20. The method of claim 17 further comprising:
separating water and oil from effluent in conduit using a separator tank.

21. The method of claim 17 further comprising:
separating gas out of the influent at a first processing rate;
separating water from oil of the influent at a second processing rate; and
regulating the flow of influent into the conduit to not exceed a processing rate of separating natural gas and to not exceed a processing rate of separating water and oil.

22. The method of claim 17 further comprising:
pumping surface water to the first inlet of the conduit for both pumping action and to prevent ice formation.

23. The method of claim 17 wherein:
controlling a specific gravity of fluid in the conduit to prevent damage to the conduit.

* * * * *